US012707365B2

(12) United States Patent
Stanczak et al.

(10) Patent No.: US 12,707,365 B2
(45) Date of Patent: Aug. 11, 2026

(54) ENHANCED CONDITIONAL HANDOVER FOR UNCREWED AERIAL VEHICLES

(71) Applicant: Nokia Technologies Oy, Espoo (FI)

(72) Inventors: Jedrzej Stanczak, Wroclaw (PL); Jeroen Wigard, Klarup (DK); István Zsolt Kovács, Aalborg (DK); Rafhael Medeiros De Amorim, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 304 days.

(21) Appl. No.: 18/632,070

(22) Filed: Apr. 10, 2024

(65) Prior Publication Data

US 2024/0349155 A1 Oct. 17, 2024

(30) Foreign Application Priority Data

Apr. 11, 2023 (FI) ..................................... 20235409

(51) Int. Cl.

| | |
|---|---|
| ***H04W 36/32*** | (2009.01) |
| ***H04B 17/318*** | (2015.01) |
| ***H04W 36/00*** | (2009.01) |
| ***H04W 36/36*** | (2009.01) |
| ***H04W 76/20*** | (2018.01) |

(52) U.S. Cl.
CPC .......... *H04W 36/32* (2013.01); *H04B 17/328* (2023.05); *H04W 36/0058* (2018.08); *H04W 36/362* (2023.05); *H04W 76/20* (2018.02)

(58) Field of Classification Search
CPC ... H04W 36/32; H04W 36/362; H04W 76/20; H04W 36/0058; H04B 17/328
See application file for complete search history.

(56) References Cited

U.S. PATENT DOCUMENTS

2022/0386208 A1* 12/2022 Phuyal ..................... G08G 5/57
2024/0147287 A1* 5/2024 Lee ....................... H04W 24/10
2024/0147337 A1* 5/2024 Huang ................ H04W 36/322

FOREIGN PATENT DOCUMENTS

WO WO-2018203120 A1 * 11/2018 ........... H04W 16/18

* cited by examiner

*Primary Examiner* — Brenda H Pham
(74) *Attorney, Agent, or Firm* — Barta Jones, PLLC

(57) ABSTRACT

There is provided an apparatus comprising means for communicating a travel path plan of the apparatus to a communication network; means for receiving from the communication network information of one or more cells of the communication network associated with priorities of accessing; and means for using the received information for adjusting priorities for measurements towards different cells of the network. There is also provided a method and a computer program product.

20 Claims, 7 Drawing Sheets

ENHANCED CONDITIONAL HANDOVER FOR UNCREWED AERIAL VEHICLES

TECHNICAL FIELD

The present invention relates to methods and apparatuses for enhanced conditional handover for uncrewed aerial vehicles.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The interest for uncrewed aerial vehicles (UAV, a.k.a. unmanned aerial vehicles, drones) based services has increased, including e.g. for multiple drone operation, personal entertainment for flight experience, cargo delivery, etc. The capability for remote control and data transmission are some key aspects for enhancements of interest for service providers and/or operators and also for drone manufacturers. The aerial vehicles equipped with some kind of wireless communication device(s) are also called as aerial user equipment or aerial UE in this specification.

Interference issues that may be generated by aerial UEs may need to be considered in order not to disrupt the operation of a network designed for terrestrial UEs. Aerial UEs may be able to fly within a plurality of areas of cells of a wireless communication system. Therefore, in addition to the interference issues handover situations may also need consideration.

A conditional handover (CHO) has been specified as a part of Rel-16 3GPP. Its main purpose was to improve mobility robustness and reliability. This was achieved thanks to decoupling the handover preparation and execution phases. UE was executing a HO towards the target cell only upon fulfilling the associated condition.

In the Rel-17 the conditional handover has been adopted by for various functionalities defined by 3GPP, such as Non-Terrestrial Networks (NTN) or Network Energy Savings (NES). CHO-related enhancements for UAVs are also widely supported by various companies in 3GPP.

A flight path plan is a feature specified as a part of Rel-15 LTE, exclusively for UAV UEs. As a part of a flight path plan, the UE is configured to report a list of waypoints (i.e. location and associated timestamp) reflecting the UAV's flight path. The network may use such information to plan the radio resource assignments accordingly.

An issue regarding the flight path plan is, in particular, how the network prepares a conditional handover for future cells and informs the UAV UE, including the time period when particular configurations are valid. Another issue is which of the prepared cells for the conditional handover the UE shall measure and consider for conditional handover execution, taking into account what has been indicated in the flight path plan and how the network assesses the probability of the UE accessing a particular cell.

SUMMARY

Some embodiments provide a method and apparatus for enhanced conditional handover for uncrewed aerial vehicles.

According to some embodiments, a flight path plan of an uncrewed aerial vehicle equipped with a communication equipment (user equipment) is exploited for improved conditional handover configuration and planning. The network may assign a probability of accessing each of the cells in a list of potential target cells and may configure for a particular user equipment the estimated candidate cells for the conditional handover.

A UE may be provided with information indicating an ordered list of target cells and radio configurations associated with each of the target cell. The ordered list of targets cells may indicate a chain of handover to be performed from one target cell to another. In other words, the ordered list may describe an estimated cell-trajectory of the terminal device associated with future handover. In other words, the UE may be prepared with CHO configurations for cells beyond the next cell change.

The user equipment may apply relaxed measurements towards the cells with low probability (e.g. lower than configurable threshold) while prioritizing measurements towards the cells with higher probability of accessing (e.g. higher than a configurable threshold). This may allow the user equipment to optimize its power consumption and measurement procedures. At the same time the user equipment may be configured with expected measurement values, like RSRP and RSRQ, of the cells it is expected to measure, and the user equipment may only report the measurements to the gNB when the expected value is different with a certain configured margin from the measured value. When the cell probabilities are explicitly (e.g. as a quantized list) provided by the network to the user equipment, the user equipment may apply relaxed measurements based on this information.

According to a first aspect, there is provided an apparatus comprising:

- means for communicating a travel path plan of the apparatus to a communication network;
- means for receiving from the communication network information of one or more cells of the communication network associated with priorities of accessing;
- means for using the received information for adjusting priorities for measurements towards different cells of the network.

In accordance with an embodiment, the apparatus comprises:

- means for applying relaxed measurements for the one or more cells having probability of accessing below a threshold.

In accordance with an embodiment, the apparatus comprises:

- means for receiving from the communication network a time of stay value.

In accordance with an embodiment, the apparatus comprises:

- means for deriving a time window for a conditional handover to one or more target cells based on the time of stay value and a time of a preceding handover.

In accordance with an embodiment, the apparatus comprises:

- means for performing a random access with a target cell selected from the one or more cells when a condition for the handover is met.

According to a second aspect there is provided a method comprising:

- communicating a travel path plan of the apparatus to a communication network;

receiving from the communication network information of one or more cells of the communication network associated with priorities of accessing;

means for using the received information for adjusting priorities for measurements towards different cells of the network.

In accordance with an embodiment, the method comprises:

applying relaxed measurements for the one or more cells having probability of accessing below a threshold.

In accordance with an embodiment, the method comprises:

receiving from the communication network a time of stay value.

In accordance with an embodiment, the method comprises:

deriving a time window for a conditional handover to one or more target cells based on the time of stay value and a time of a preceding handover.

In accordance with an embodiment, the method comprises:

performing a random access with a target cell selected from the one or more cells when a condition for the handover is met.

According to a third aspect there is provided an apparatus comprising at least one processor; and at least one memory storing instructions that, when executed by the at least one processor, cause the apparatus at least to:

communicate a travel path plan of the apparatus to a communication network;

receive from the communication network information of one or more cells of the communication network associated with priorities of accessing;

use the received information for adjusting priorities for measurements towards different cells of the network.

In accordance with an embodiment, the at least one memory is storing instructions that, when executed by the at least one processor, cause the apparatus at least to:

apply relaxed measurements for the one or more cells having probability of accessing below a threshold.

In accordance with an embodiment, the at least one memory is storing instructions that, when executed by the at least one processor, cause the apparatus at least to:

receive from the communication network a time of stay value.

In accordance with an embodiment, the at least one memory is storing instructions that, when executed by the at least one processor, cause the apparatus at least to:

derive a time window for a conditional handover to one or more target cells based on the time of stay value and a time of a preceding handover.

In accordance with an embodiment, the at least one memory is storing instructions that, when executed by the at least one processor, cause the apparatus at least to:

perform a random access with a target cell selected from the one or more cells when a condition for the handover is met.

According to a fourth aspect there is provided an apparatus comprising:

means for receiving from a user equipment information of a travel path plan of the user equipment;

means for preparing for the user equipment one or more conditional handover configurations related to a plurality of cells of a wireless communication network based on the travel path plan;

means for assigning priorities of accessing of the plurality of cells; and means for communicating the priorities to the user equipment.

According to a fifth aspect there is provided a method comprising:

receiving from a user equipment information of a travel path plan of the user equipment;

preparing for the user equipment one or more conditional handover configurations related to a plurality of cells of a wireless communication network based on the travel path plan; assigning priorities of accessing of the plurality of cells; and communicating the priorities to the user equipment.

According to a sixth aspect there is provided an apparatus comprising at least one processor; and at least one memory storing instructions that, when executed by the at least one processor, cause the apparatus at least to:

receive from a user equipment information of a travel path plan of the user equipment;

prepare for the user equipment one or more conditional handover configurations related to a plurality of cells of a wireless communication network based on the travel path plan;

assign priorities of accessing of the plurality of cells; and communicate the priorities to the user equipment.

According to some aspects, there is provided the subject matter of the independent claims. Some further aspects are defined in the dependent claims. The embodiments that do not fall under the scope of the claims are to be interpreted as examples useful for understanding the disclosure.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 1:
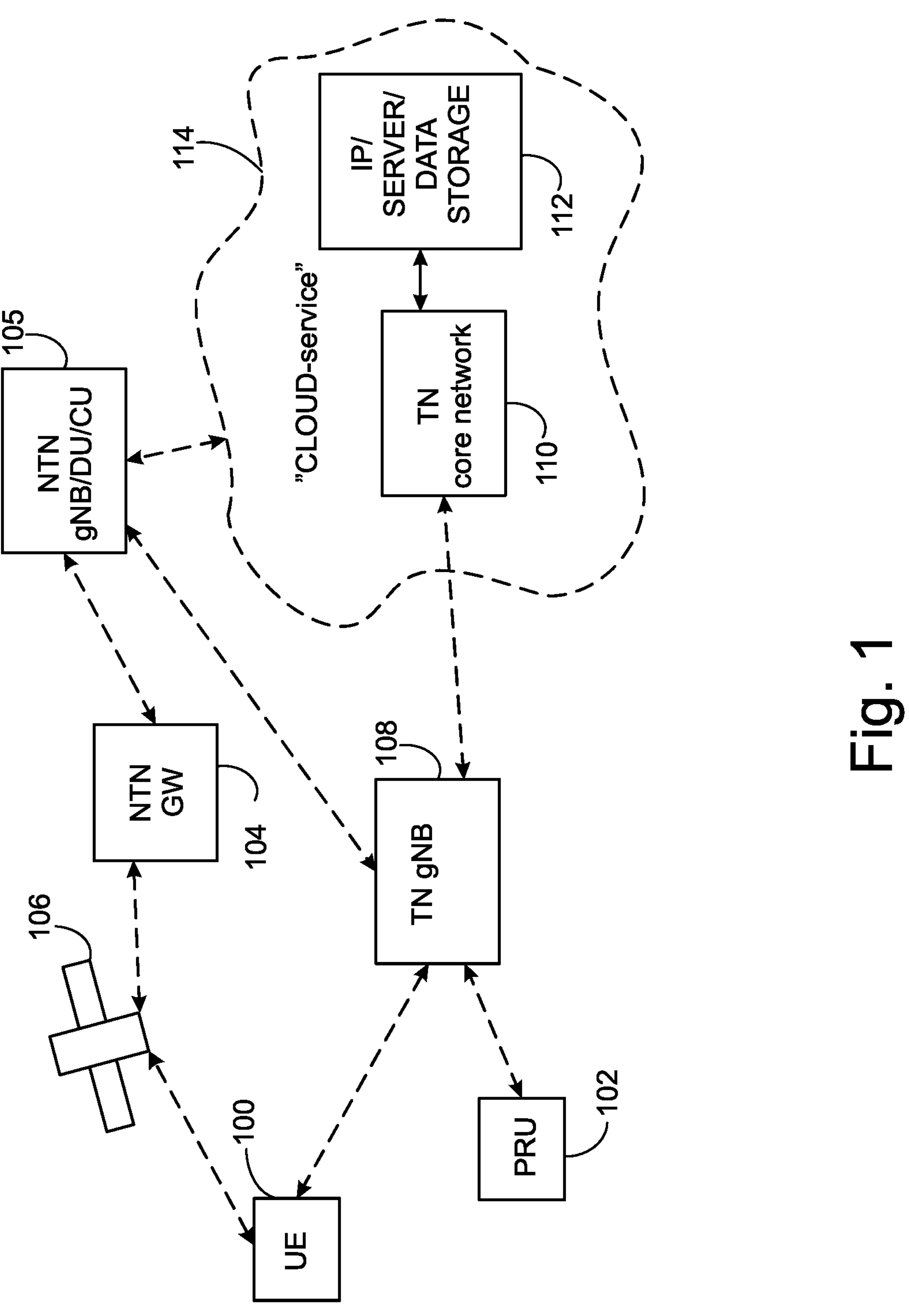
FIG. 1 shows a part of an exemplifying wireless communications access network in accordance with at least some embodiments of the present invention.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows a user device (UE) 100 and a positioning reference unit (PRU) 102 configured to be in a wireless connection on one or more communication channels in a cell with an access node (such as (c/g) NodeB) 104 providing the cell. The physical link from a user device to a (c/g) NodeB is called uplink or reverse link and the physical link from the (c/g) NodeB to the user device is called downlink or forward link. It should be appreciated that (c/g) NodeBs or their functionalities may be implemented by using any node, host, server or access point etc. entity suitable for such a usage.

A communication system typically comprises more than one (e/g) NodeB in which case the (c/g) NodeBs may also be configured to communicate with one another over links, wired or wireless, designed for the purpose. These links may be used for signaling purposes. The (c/g) NodeB is a computing device configured to control the radio resources of communication system it is coupled to. The (e/g) NodeB may also be referred to as a base station, an access point or any other type of interfacing device including a relay station capable of operating in a wireless environment. The (c/g) NodeB includes or is coupled to transceivers. From the transceivers of the (c/g) NodeB, a connection is provided to an antenna unit that establishes bi-directional radio links to user devices. The antenna unit may comprise a plurality of antennas or antenna elements. The (c/g) NodeB is further connected to a core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access Management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

In this specification the user device mainly means an aerial UE.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented as a system, where macro coverage is provided by the LTE and 5G radio interface access comes from small cells by aggregation to the LTE. In other words, 5G supports both inter-RAT operability (such as LTE-5G) and inter-RI operability (inter-radio interface operability, such as below 6 GHz-cmWave, below 6 GHZ-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a non-terrestrial network, a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

The non-terrestrial network may comprise NTN gateways 104, NTN gNBs 105 and NTN satellites 106, for example.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU) and non-real time functions being carried out in a centralized manner (in a centralized unit, CU).

5G may also utilize satellite communication to enhance or complement the coverage of 5G service, for example by providing backhauling, wireless access to wireless devices, service continuity for machine-to-machine (M2M) or Internet of Things (IoT) devices or for passengers on board of vehicles, or ensuring service availability for critical communications, and future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs (High Altitude Platform Stations). Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities that create on-ground cells. The on-ground cells may be created through an on-ground relay node or by a gNB located on-ground or in a satellite.

The depicted system is only an example of a part of a radio access system and in practice, the system may comprise a plurality of (c/g) NodeBs, the user device may have an access to a plurality of radio cells and the system may comprise also other apparatuses, such as physical layer relay nodes or other network elements, etc. At least one of the (c/g) NodeBs or may be a Home (c/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (c/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (c/g) NodeBs are required to provide such a network structure.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHZ. Thus, FR2 includes the bands in the mmWave range, which due to their shorter range and higher available bandwidth require somewhat different approach in radio resource management compared to bands in the FR1.

FIG. **4*a* illustrates as a simplified block diagram some elements of the gNB 108 of the terrestrial network. The gNB 108 comprises a control unit 401, which may comprise at least one processor 402 and at least one memory 403. The control unit 401 controls the operation of the gNB 108. The gNB 108 also comprises a transceiver 404, which can be used to communicate with the UEs and the core network 110** of the terrestrial network.

In accordance with an embodiment, the gNB 108 also comprises a receiver 405, which may be a basic energy detection receiver and need not be able to decode signals received by the receiver 405. The control unit 401 (e.g. a processor 402) may form a control signal to the receiver 405 to set a reception frequency band of the receiver 405 to a desired value. The receiver 405 may then output an indication proportional to the energy of the received radio frequency signals. The indication may be a voltage, a current, a digital signal etc. If the output signal is analogue, the gNB 108 may comprise a converter 406 (analogue-to-digital converter, ADC) to convert the analogue signal to a digital signal to be provided to an energy measurement circuitry 409 and further to the processor 402 for analysing the energy measurement results. The memory 403 may comprise instructions 410 for the processor to perform the analyses and determination of the UEs.

There are also one or more antennas 407, 408 for transmitting and receiving radiofrequency signals. The energy detection receiver 405 may have a separate antenna 408 or it may utilize the same antenna 407 than the transceiver 404.

The antenna 407 and/or 408 may be a MIMO antenna, for example. FIG. **4*a*** also illustrates an example of a radiation pattern of such MIMO antenna in a simplified manner. The dotted lines illustrate examples of beams of the MIMO antenna.

A baseband circuitry 412 is used for normal communication operations of the gNB, such as encoding/decoding, payload handling of communication signals etc.

FIG. **4*b* illustrates as a simplified block diagram some elements of the user equipment 100 in accordance with an embodiment. The UE 100 comprises a control unit 421, which may comprise at least one processor 422 and at least one memory 423. The control unit 421 controls the operation of the UE 100. The UE 100 also comprises a transceiver 424, which can be used to communicate with the gNB and the core network 110**.

In accordance with an embodiment, the UE may also comprise a converter 426 (analogue-to-digital converter, ADC), wherein the converter 426 may have an input to receive signals from a baseband circuitry 432. The converter 426 may then form an output which is proportional to some property of the signal from the baseband circuitry 432. For example, the output indicates a power or energy of a received signal. The control unit 421 (e.g. a processor 422) may form a control signal to the converter 426 to start conversion of the input signal to a digital form. The converter 426 converts the analogue signal to a digital signal and provides a corresponding sample or samples to an energy measurement circuitry 429 and further to the processor 422 for analysing the energy measurement results. The memory 423 may comprise instructions 430 for the processor to perform the analyses.

Figure 4A:
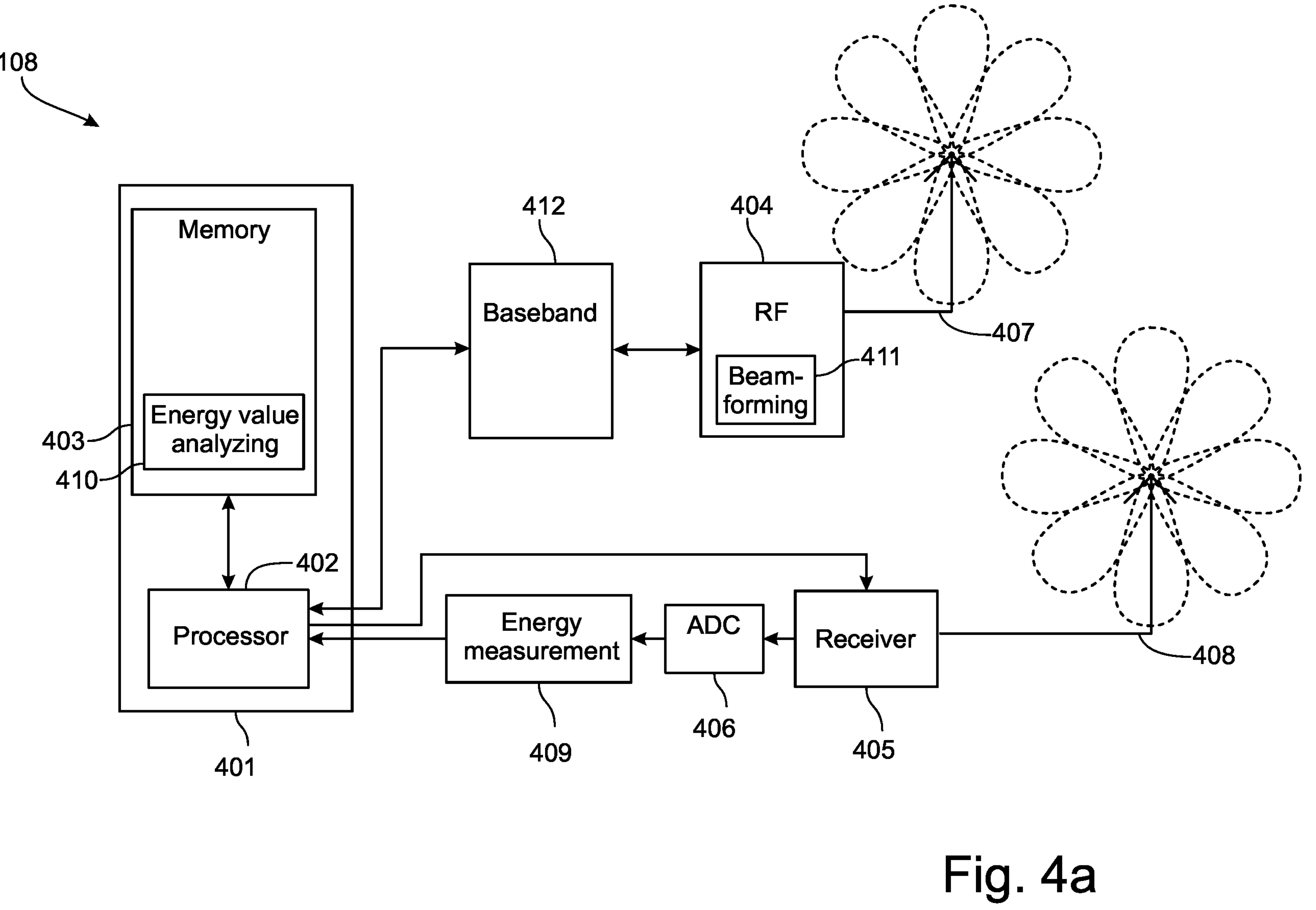
FIG. 4*a* illustrates as a simplified block diagram some elements of a network element in accordance with at least some embodiments of the present invention.
Figure 4B:
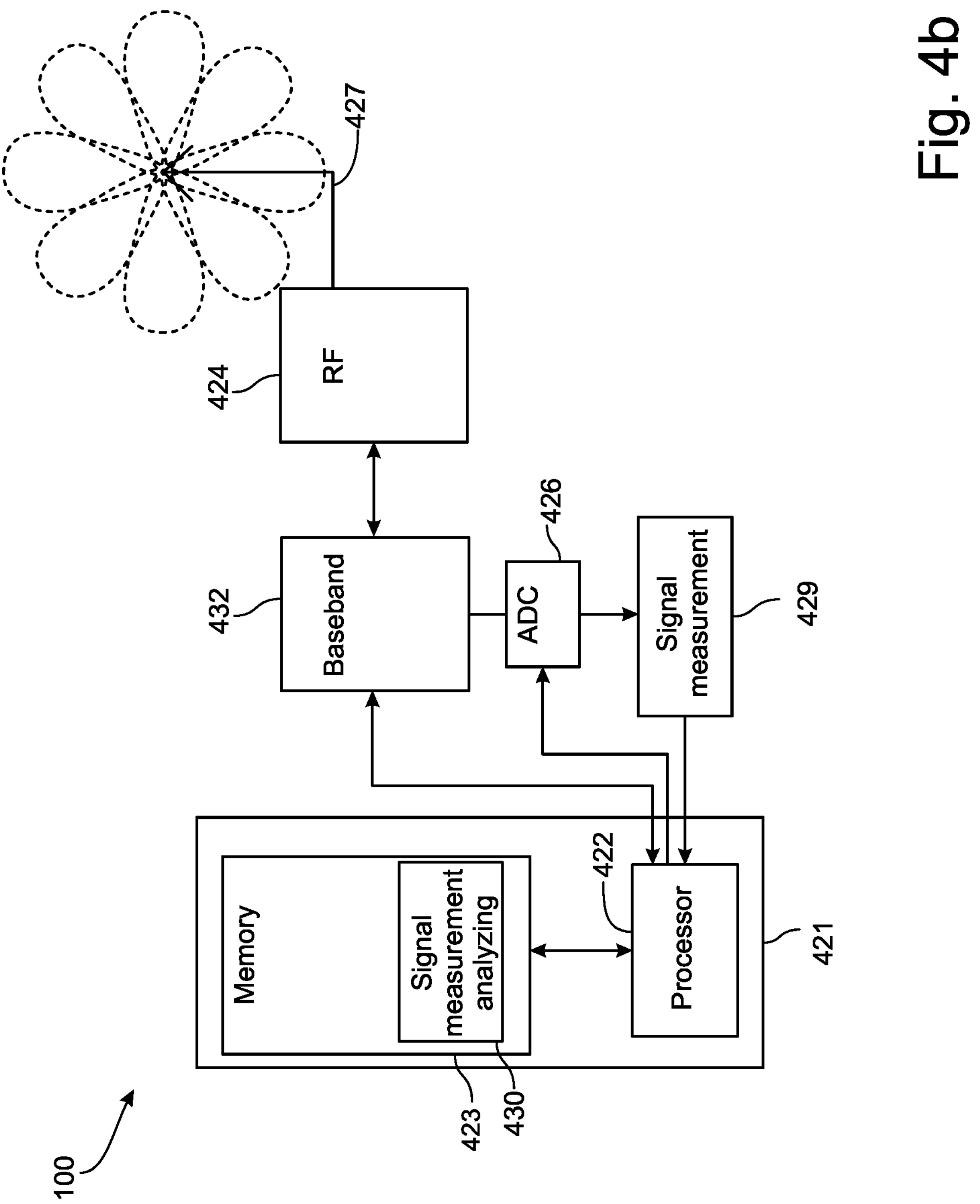
FIG. 4*b* illustrates as a simplified block diagram some elements of a user equipment in accordance with at least some embodiments of the present invention.

There are also one or more antennas 427 for transmitting and receiving radiofrequency signals. The antenna 427 may be a MIMO antenna, for example. FIG. 4*b* also illustrates an example of a radiation pattern of such MIMO antenna in a simplified manner. The dotted lines illustrate examples of beams of the MIMO antenna.

The baseband circuitry 422 is used for normal communication operations of the UE, such as encoding/decoding, payload handling of communication signals etc.

Figure 5:
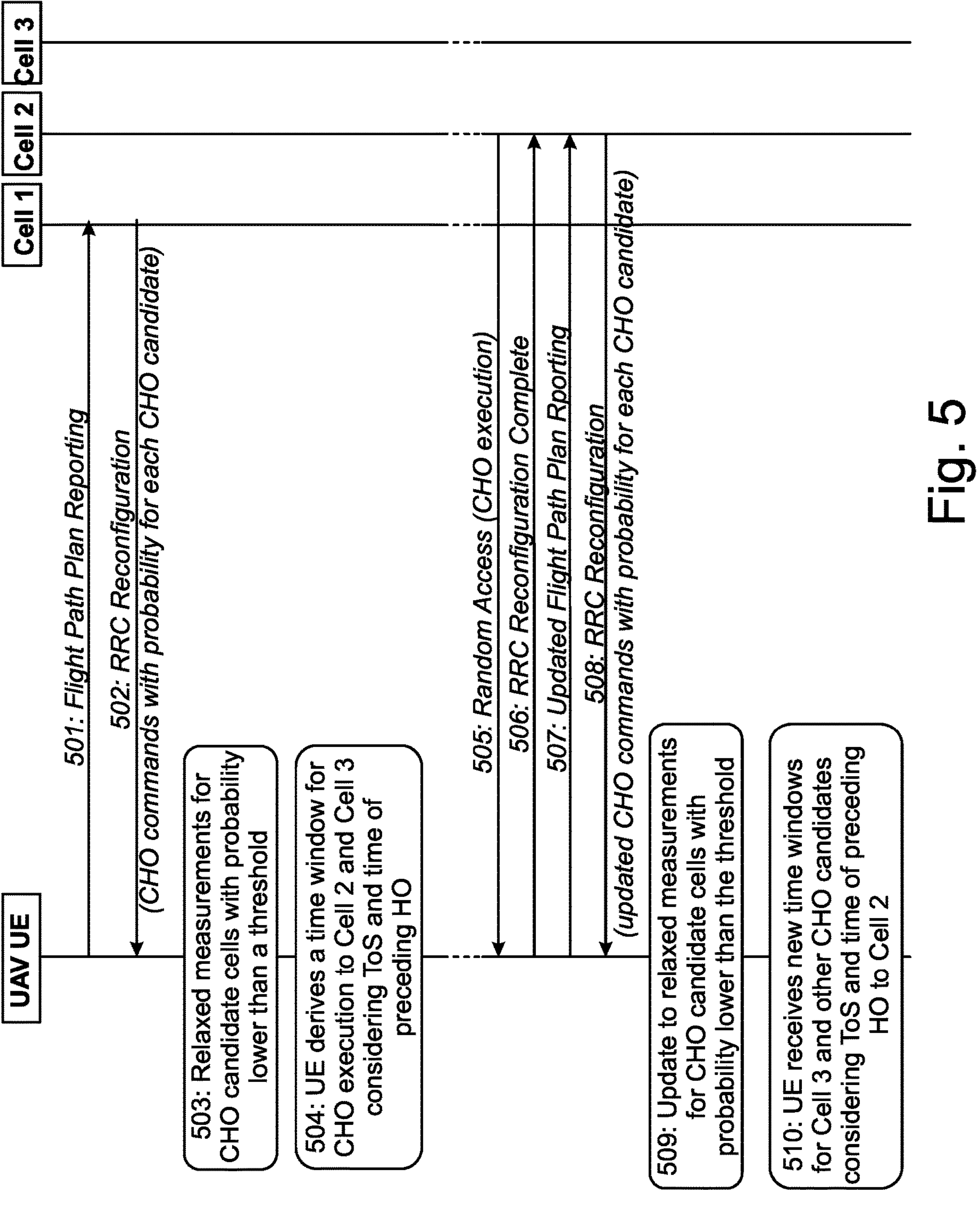
FIG. 5 depicts a signalling diagram between a UAV user equipment and network elements of a communication network.
Figure 6:
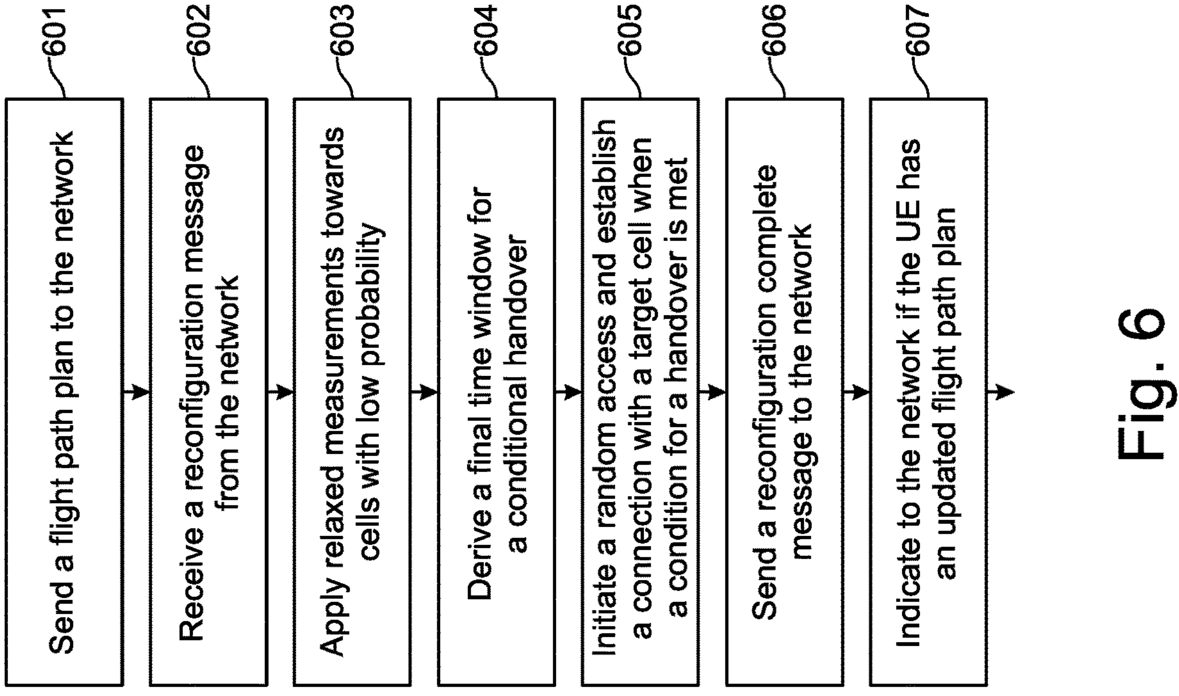
FIG. 6 shows a method according to an embodiment as a simplified diagram.

In the following a method according to an embodiment will be described with reference to the signalling diagram of FIG. 5 and the flow diagram of FIG. 6.

The UE sends 601 to a network element of a communication network a report 501 which includes a flight path plan of the UE. In this example the report is sent to a cell called as a first cell (Cell 1) in this example, which may be assumed to be a serving cell for the UE at the moment. The report may be sent, for example, in a similar way as supported in the LTE. However, the details of sending the report may differ in different communication networks. The flight path plan may include information on waypoints along the planned UAV route. Each waypoint may contain an indication of the location and associated timestamp i.e. when the UAV is expected to arrive at the location. The timestamp may be, for example, an absolute time (so-called wall clock time) or relative to a starting moment or a previous location i.e. expected time from the start of flight or from the previous location. The flight path plan may cover the entire UAV route from mission's source to a destination, or a subset of it, e.g. for the next 100's of minutes or 10's of seconds or for a subset of distance the UAV shall cover (e.g. in meters).

The network element receives the report and based on the reported flight path plan, the network prepares conditional handover configurations and execution conditions for multiple cells i.e. for two or more cells. Those could be the conditional handover configurations/conditions for the next cell change and/or for subsequent handovers beyond the closest cell change. The commands can be associated with the priority/probability of accessing each cell, which may be derived using the flight path plan reported in step 601.

It should be noted that the priority or probability are just examples of properties which can be used in determining an order of cells in a list of cells (chain of cells). Generally that kind of property may be called as a general priority or weight, configured per cell (or even per frequency carrier).

With the content of flight path plan and/or historical data from the flights along the same route, or a flight corridor, flight paths/trajectory in the vicinity of the current flight path, the network assigns a probability of accessing each of the cells in a list and configures for the particular UE the estimated conditional handover candidate cells.

The network element sends a reconfiguration message 502, such as an RRC Reconfiguration. This message is associated with the information of the probability of accessing each of the cells in the list.

The UE receives 602 the reconfiguration message and applies 503, 603 relaxed measurements towards the cells with low probability while prioritizing measurements towards the cells with higher probability of accessing. The low probability may be, for example, lower than a configurable threshold. This may allow the UE to optimize its power consumption and measurement procedures. The threshold can be delivered to the UE also in connection with the transmission of the reconfiguration message 502 in the step 603, jointly with conditional handover commands. Additionally or alternatively, the threshold may be provided using different means, such as in system information, which would be a common threshold, used by all UEs in this cell (i.e. it does not need to be provided in dedicated signalling). Cells with priority/probability larger than the threshold may be measured normally i.e. in a non-relaxed manner.

The UE may also be configured with expected measurement values, like received signal received power (RSRP) and/or received signal received quality (RSRQ), of the cells the UE is expected to measure, and, in accordance with an embodiment, the UE will only report the measurements to the gNB when the expected value is different with a certain configured margin from the measured value. The configuration with expected measurement values may include a time interval in which they are expected to be valid. Some examples of these time intervals are the start of the time window when a conditional handover is allowed (T1) and the end of the time window when the conditional handover is allowed (T2).

When the cell probabilities are explicitly provided by the network to the UE, e.g. as a quantized list of the cells, the UE can apply relaxed measurements based on this information.

Unlike in a non-terrestrial network (NTN) where the UE may obtain T1 and T2 values in the dedicated message sent from the network, the UAV UE would be instructed to derive 604 the final time window for conditional handover execution by itself, based on the knowledge of its location, speed, travelling direction, height, etc.

A Time of Stay (ToS) may be provided by the network to the UE, either by means of broadcast signalling or dedicated signalling to individual UAV UEs. The Time of Stay may be, for example, an expected time the UE would remain in the area of a certain cell.

Figure 7:
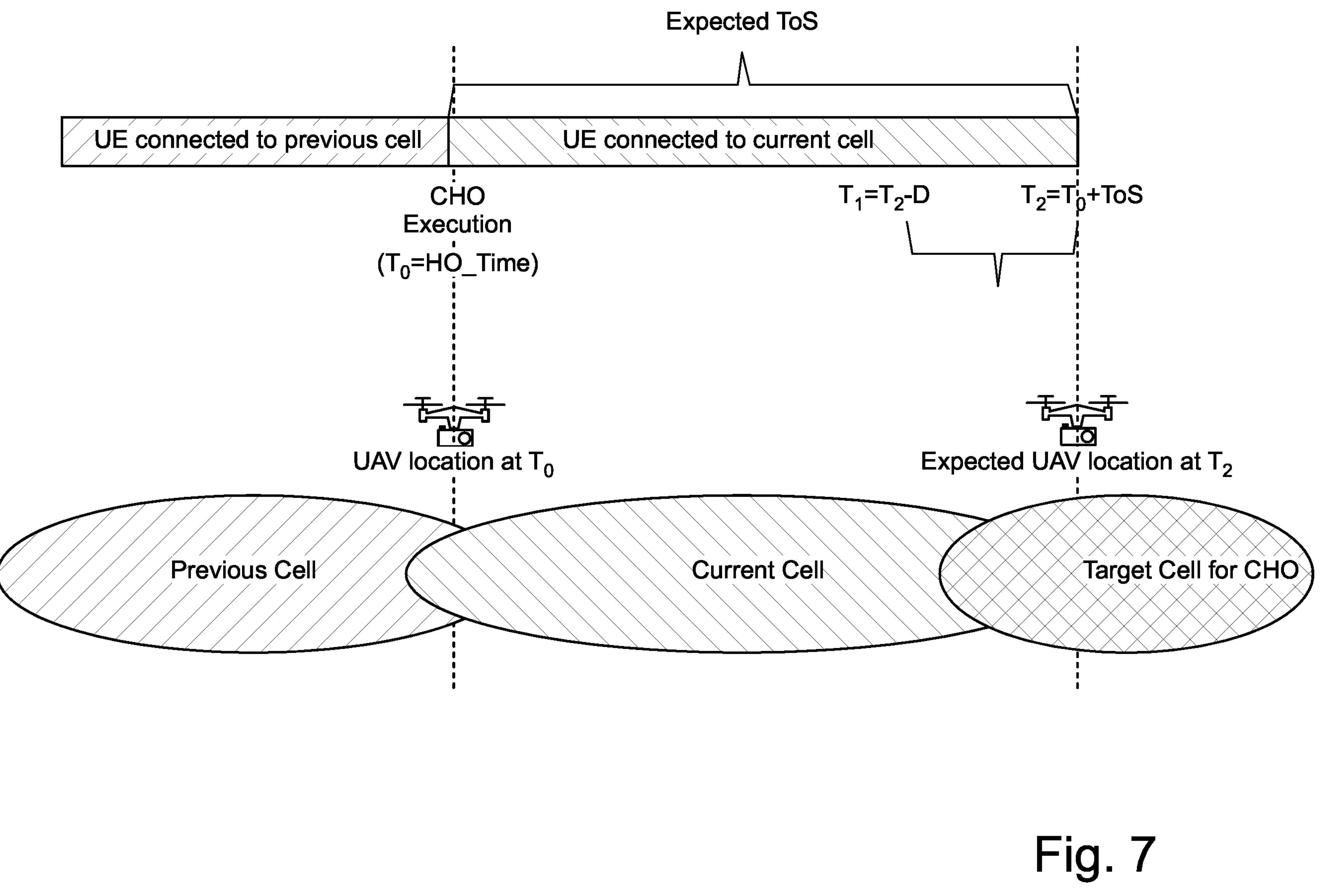
FIG. 7 shows an example on how a use equipment can determine a conditional time window for execution of a conditional handover, in accordance with an embodiment.

UE considers the Time of Stay (ToS) and the time of a previous handover to derive a new window for the next conditional handover execution. This is estimated as per the following definition, which is also illustrated in FIG. 7:

$$[\mathrm{HO\_time} + ToS - D, \mathrm{HO\_time} + ToS],$$

where $$D = T2 - T1$$

where:

T1=Start of the time window when the conditional handover is allowed

T2=End of the time window when the conditional handover is allowed

Based on the executed conditional handovers, the network can update the estimated probabilities for the cells along a historical flight path/corridor segment, and these new probabilities may be used next time the UAV reports a flight path close to the same flight path/corridor segment.

The information and processing for these updates could reside in any cloud-native network (CN) function, such as an instance of a network data analytics function (NWDAF), or an instance of a management data analytics function (MDAF), along with other functionalities required to interact with a 3-rd party USS/UTM.

When a condition for a handover is met, the UE initiates 505, 605 random access and establishes the connection with the target cell. The target cell in this example is a cell called as a second cell Cell 2 in this example.

In accordance with an approach, the handover may be executed using RACH-less approach, where the RA is skipped if the UE has a valid timing advance and UL grant for a transmission towards the new cell.

The random access (RA) of the step 605 is completed by sending 606 an RRC Reconfiguration Complete message 506 by the UE to the network element at the second cell Cell 2. The UE may also indicate 607 with the RRC Reconfiguration Complete message to the network element that the UE has an updated flight path plan to be reported. Alternatively, this can occur e.g. as a separate message transmission illustrated in FIG. 5 with transmission 507 of an updated flight path plan reporting message to the second cell.

The new serving cell, i.e. the second cell in this example, may then perform similar operations than the first cell when it has received the flight path plan from the UE. Hence, the second cell may prepare conditional handover configurations and execution conditions for multiple cells i.e. for two or more cells, and provide 508 new or updated conditional handover commands by sending a RRC reconfiguration message to the UE. The serving cell may prepare the new configurations from scratch or it may just update those which UE has obtained earlier, from cell 1.

The UE may receive the RRC reconfiguration message and update 509 to relaxed measurements for conditional handover candidate cells with probability lower than the threshold. The UE may decide 510 which cells it can measure according to relaxed requirements and may derive a new time window for a conditional handover towards each of the prepared cells. In this derivation the UE may consider a time of stay and the time of the preceding handover to the second cell i.e. to the current serving cell.

It should be noted that in the description above it was assumed that some conditional handover commands configured in the previous cell (Cell 1 in this example) can remain valid after the conditional handover to the second cell (Cell 2). They are updated by the UE, at least with respect to the time window, considering the new ToS and the time of handover, or they can be partly updated by the network.

It should also be noted that the flight path plan is only an example of a route the UE may be intended to travel. In some embodiments the travel route is not in the air but on a ground, wherein the user equipment may report a travel path plan to the network.

In accordance with another embodiment, the network may derive a second time window from the handover time and the time of stay to trigger the UE to start measuring on measurement objects that require a measurement gap. Such a measurement gap causes an interruption on the connectivity of the UE. One purpose of the derivation of the second time window is to reduce the amount of gaps the UE may experience during its travel time through the flight path. For example, a measurement object configured with measurement gaps might be valid in the time window corresponding to:

$$[\text{HO\_time} + ToS - D - \text{T\_measure}, \text{HO\_time} + ToS]$$

where T_measure corresponds to the minimum requirement in which the UE shall be capable to detect an inter-frequency cell.

In this embodiment, the UE would not have measurement gaps before the beginning of this interval, nor after T2 is reached i.e. the limit for conditional handover execution. The gap is used only when the actual measurement is to be conducted, i.e. not from the time of configuring it.

The methods presented above may provide some advantages. For example, the UE may be allowed to use the newly introduced time conditions for pre-configured conditional handover chains, benefitting from the advantages of this feature avoiding early or late handovers, saving time in the handover execution, etc.

It may also be possible that the UE is able to save power and potentially to save measurement gaps by adopting relaxed measurements towards the cells with lower probability (assessed using flight path plan) of becoming a target cell for the conditional handover.

An RF frontend comprises RF circuitry between a baseband processor and one or more antenna ports. The RF frontend comprises a transmission path/chain and a reception path/chain. Examples of circuitry of the RF frontend comprise one or more band-pass filters, power amplifiers, local oscillators, and mixers. The transmission path converts a baseband signal to RF signal for feeding the RF signal to antenna via an antenna port. The reception path converts an RF signal received by an antenna connected to an antenna port to a baseband signal that is fed to the baseband part. The conversion of the signal between the baseband processor and the antenna port may be via at least one intermediate frequency. The RF frequencies may be licensed or unlicensed frequencies. Examples in accordance with at least some embodiments may utilize at least RF frequencies below 6 GHZ.

A baseband signal comprises an unmodulated signal or a modulated signal comprising one or more symbols according to a modulation method. The baseband signal may be an IQ signal comprising an in-phase and a quadrature phase. An example of the modulation method is a multi-carrier modulation method such as an orthogonal frequency-division multiplexing (OFDM) scheme. The OFDM symbols may form a transmission burst for a communications channel of a wireless communications system. Examples of the communications channels comprise at least shared and dedicated communications channels that may be uplink, UL, channels or downlink, DL, channels. An uplink channel refers to a channel for transmitting data from a wireless device to an access node and a downlink channel refers to a channel for transmitting data from an access node to a wireless device.

MIMO in wireless communications is a technique that enables the transmission and reception of multiple independent data streams. This helps to increase the maximum data rate at which communications can occur reliably. Some applications of MIMO are described in the following sections.

A MIMO transceiver, MIMO TRX, comprises at least an RF frontend and antenna ports for connecting to multiple antennas for transmission, TX, and reception, RX, of a MIMO transmission. The MIMO transceiver may be capable of single antenna transmissions, e.g. Single input Multiple output, single input single output. The RF frontend may be connected to a baseband processor. The RF frontend comprise a plurality of unique hardware (HW) paths through the RF front between the baseband processor and antenna ports. The HW paths comprise transmission paths and reception paths. Each of the HW paths introduce a delay that is characteristic for a specific transmission path. A base band signal for a MIMO transmission is processed by two or more transmission paths and fed to at least two antennas via antenna ports. Transmission times of the signal via each of the antennas should be time aligned for reducing a delay margin required of the MIMO transmission.

A baseband transceiver, TRX, may be a baseband processor that performs baseband processing of transmitted and received signals via an RF frontend. A typical interface between the baseband processor and the RF frontend comprises an analog-to-digital converter, ADC, and a digital-to-analog converter, DAC. The baseband processor processes baseband signals for transmission and reception by the RF frontend.

At least some of the embodiments may be applied in a wireless communication system or a wireless communication network that supports TSN. 5G standard is seen as one example that could fit to meet very stringent requirements in terms of both latency and reliability as well as highly precise synchronization accuracy of the applications running over TSN networks. Also other standards may be feasible.

Figure 3:
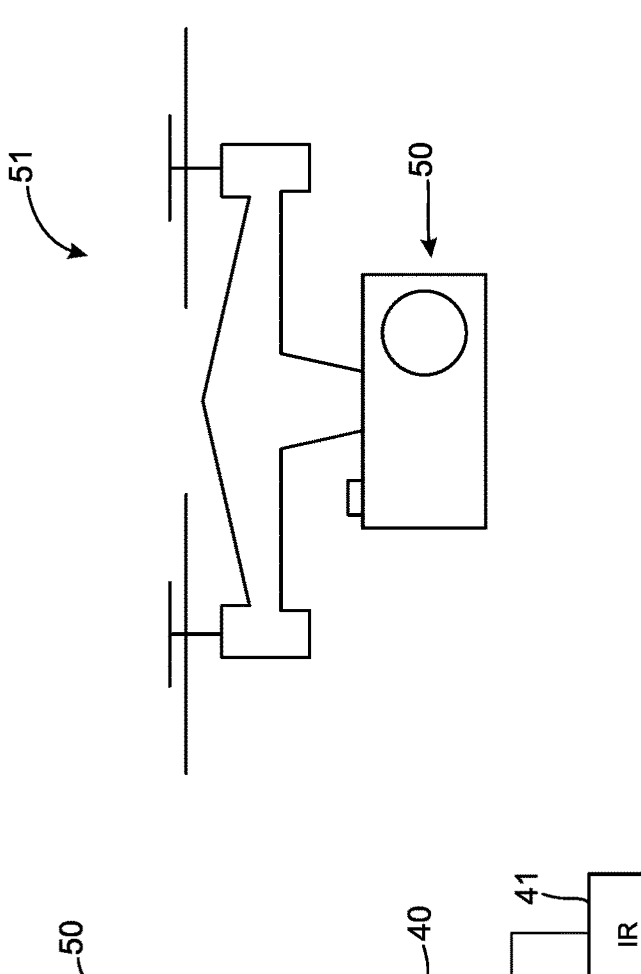
FIG. 3 shows as a perspective view the electronic device of FIG. 2.
Figure 2:
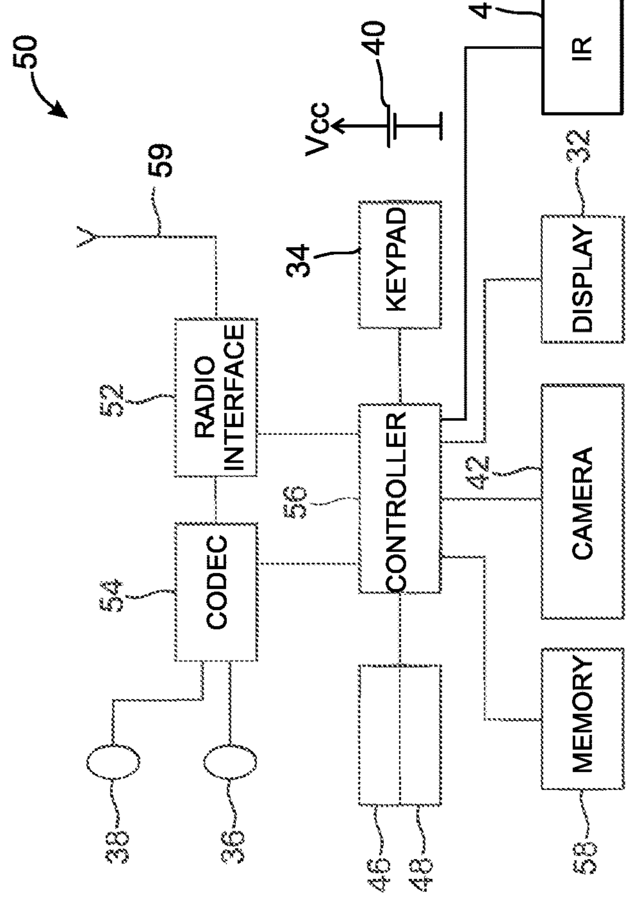
FIG. 2 shows a block diagram of an example of an electronic device representing a UAV user equipment.

The following describes in further detail an example of an electronic device representing a UAV user equipment 51. In this regard reference is first made to FIG. 2 which shows a schematic block diagram of an exemplary apparatus or electronic device 50 depicted in FIG. 3.

The electronic device 50 may for example be a wireless device, mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example, the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 (also can be called as radio frequency module) connected to the controller (or the processor) and suitable for generating wireless communication signals for example for communication with a cellular communications network, a wireless communications system or a wireless local area network. The radio interface circuitry 52 includes one or more transmitters and one or more receivers. In this case, the transmitter and the receiver can be configured to one entity such as a radio transceiver. The apparatus 50 may further comprise a plurality of antennas 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection.

In the following some example implementations of apparatuses utilizing the present invention will be described in more detail.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analogue and/or digital circuitry) and (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:

a processor; and a non-transitory computer-readable medium comprising computer-executable instructions that, when executed by the processor, cause the processor to perform the following operations:

communicating a travel path plan of the apparatus to a communication network, content of the travel path plan comprising information on waypoints along a planned route of the apparatus, the information on waypoints containing an indication of a location and associated timestamp indicating when the apparatus is expected to arrive at the location;

based on the content of travel path plan and historical data from flights along a same route as the planned route and flight paths and trajectory in a threshold vicinity of the planned route, receiving a probability of accessing each cell in a list of cells and a re-configuration message estimating conditional handover candidate cells based on the received probability;

receiving, from the communication network, a time of stay value;

deriving a start of a time window and an end of the time window for a conditional handover to one or more target cells based on the time of stay value and a time of a preceding handover and property values related to the apparatus, the property values comprising: a location of the apparatus, speed of the apparatus, travelling direction of the apparatus, and a height of the apparatus;

receiving, from the communications network, a second time window based on a handover time and a time of stay;

based on the received second time window, triggering measuring on cells that require a measurement gap to reduce an amount of gaps the apparatus experiences during travel time through the planned route;

based on the re-configuration message, applying measurements to cells that require a measurement gap and applying relaxed measurements towards cells with low probability of accessing while prioritizing measurements towards cells with higher probability of accessing;

measuring received signals;

comparing the measured signals with a margin value, based on expected measurement values, only reporting measurements to the communication network when a measured value differs from a previous measured value more than the margin value, wherein measurement values comprise a received signal received power (RSRP) and a received signal received quality (RSRQ) of the cells the apparatus is expected to measure;

based on a condition of the conditional handover being met, initiate random access and establish a connection with a target cell; and compete the random access by sending radio resource control (RRC) reconfiguration complete message a network element at the targe cell, the RRC reconfiguration complete message further indicating that the apparatus has an updated planned route to be reported.

2. The apparatus according to claim 1, wherein the computer-executable instructions further cause the processor to configure expected measurement values the apparatus is expected to measure.

3. The apparatus according to claim 2, wherein the updated planned route is reported after the conditional handover.

4. The apparatus according to claim 3, wherein the updated planned route is reported in a reconfiguration complete message.

5. The apparatus according to claim 4, wherein the planned route is a flight path and the apparatus is an arial user equipment.

6. The apparatus according to claim 5, wherein the conditional handover is executed using RACH-less approach.

7. The apparatus according to claim 6, wherein the computer-executable instructions further cause the processor to perform the following operations:

updating the probabilities of accessing each of the cells in the list based on previous measurement values and actual travel paths.

8. A system comprising;

an apparatus;

a processor; and a non-transitory computer-readable medium comprising computer-executable instructions that, when executed by the processor, cause the processor to perform the following operations:

communicating a travel path plan of the apparatus to a communication network, content of the travel path plan comprising information on waypoints along a planned route of the apparatus, the information on waypoints containing an indication of a location and associated timestamp indicating when the apparatus is expected to arrive at the location;

based on the content of travel path plan and historical data from flights along a same route as the planned route and flight paths and trajectory in a threshold vicinity of the planned route, receiving a probability of accessing each cell in a list of cells and a reconfiguration message estimating conditional handover candidate cells based on the received probability;

receiving, from the communication network, a time of stay value;

deriving a start of a time window and an end of the time window for a conditional handover to one or more target cells based on the time of stay value and a time of a preceding handover and property values related to the apparatus, the property values comprising: a location of the apparatus, speed of the apparatus, travelling direction of the apparatus, and a height of the apparatus;

receiving, from the communications network, a second time window based on a handover time and a time of stay;

based on the received second time window, triggering measuring on cells that require a measurement gap to reduce an amount of gaps the apparatus experiences during travel time through the planned route;

based on the re-configuration message, applying measurements to cells that require a measurement gap and applying relaxed measurements towards cells with low probability of accessing while prioritizing measurements towards cells with higher probability of accessing;

measuring received signals;

comparing the measured signals with a margin value, based on expected measurement values, only reporting measurements to the communication network when a measured value differs from a previous measured value more than the margin value, wherein measurement values comprise a received signal received power (RSRP) and a received signal received quality (RSRQ) of the cells the apparatus is expected to measure;

based on a condition of the conditional handover being met, initiate random access and establish a connection with a target cell; and compete the random access by sending radio resource control (RRC) reconfiguration complete message a network element at the targe cell, the RRC reconfiguration complete message further indicating that the apparatus has an updated planned route to be reported.

9. The system according to claim 8, wherein the computer-executable instructions further cause the processor to configure expected measurement values the apparatus is expected to measure.

10. The system according to claim 9, wherein the updated planned route is reported after the conditional handover.

11. The system according to claim 10, wherein the updated planned route is reported in a reconfiguration complete message.

12. The system according to claim 11, wherein the planned route is a flight path and the apparatus is an arial user equipment.

13. The system according to claim 12, wherein the conditional handover is executed using RACH-less approach.

14. The system according to claim 13, wherein the computer-executable instructions further cause the processor to perform the following operations:

updating the probabilities of accessing each of the cells in the list based on previous measurement values and actual travel paths.

15. A method comprising:

communicating a travel path plan of the apparatus to a communication network, content of the travel path plan comprising information on waypoints along a planned route of the apparatus, the information on waypoints containing an indication of a location and associated timestamp indicating when the apparatus is expected to arrive at the location;

based on the content of travel path plan and historical data from flights along a same route as the planned route and flight paths and trajectory in a threshold vicinity of the planned route, receiving a probability of accessing each cell in a list of cells and a re-configuration message estimating conditional handover candidate cells based on the received probability;

receiving, from the communication network, a time of stay value;

deriving a start of a time window and an end of the time window for a conditional handover to one or more target cells based on the time of stay value and a time of a preceding handover and property values related to the apparatus, the property values comprising: a location of the apparatus, speed of the apparatus, travelling direction of the apparatus, and a height of the apparatus;

receiving, from the communications network, a second time window based on a handover time and a time of stay;

based on the received second time window, triggering measuring on cells that require a measurement gap to reduce an amount of gaps the apparatus experiences during travel time through the planned route;

based on the re-configuration message, applying measurements to cells that require a measurement gap and applying relaxed measurements towards cells with low probability of accessing while prioritizing measurements towards cells with higher probability of accessing;

measuring received signals;

comparing the measured signals with a margin value, based on expected measurement values, only reporting measurements to the communication network when a measured value differs from a previous measured value more than the margin value, wherein measurement values comprise a received signal received power (RSRP) and a received signal received quality (RSRQ) of the cells the apparatus is expected to measure;

based on a condition of the conditional handover being met, initiate random access and establish a connection with a target cell; and compete the random access by sending radio resource control (RRC) reconfiguration complete message a network element at the targe cell, the RRC reconfiguration complete message further indicating that the apparatus has an updated planned route to be reported.

16. The method according to claim 15, further comprising configuring expected measurement values the apparatus is expected to measure.

17. The method according to claim 16, wherein the updated planned route is reported after the conditional handover.

18. The method according to claim 17, wherein the updated planned route is reported in a reconfiguration complete message.

19. The method according to claim 17, wherein the planned route is a flight path and the apparatus is an arial user equipment.

20. The method according to claim 19, wherein the conditional handover is executed using RACH-less approach.

* * * * *